(12) United States Patent
Sakaguchi

(10) Patent No.: US 6,304,543 B1
(45) Date of Patent: Oct. 16, 2001

(54) DISK APPARATUS WITH VERTICALLY ARRANGED OPTICAL HEAD AND ROTOR MAGNET ACCOMMODATING PORTION

(75) Inventor: Takahiro Sakaguchi, Tokyo (JP)

(73) Assignee: Teac Corporation, Tokyo (JP)

( * ) Notice: Subject to any disclaimer, the term of this patent is extended or adjusted under 35 U.S.C. 154(b) by 626 days.

(21) Appl. No.: 08/673,214

(22) Filed: Jun. 27, 1996

(30) Foreign Application Priority Data

Jun. 29, 1995 (JP) .................................................... 7-197875

(51) Int. Cl.⁷ ....................................................... G11B 7/08
(52) U.S. Cl. ................................................................ 369/266
(58) Field of Search ........................ 369/266; 360/99.08, 360/99.04, 98.07

(56) References Cited

U.S. PATENT DOCUMENTS 4,870,703 * 9/1989 Augeri et al. ...................... 360/98.07
5,334,896 * 8/1994 Ohsawa .......................... 360/98.07 X
5,528,436 * 6/1996 Peter .................................. 360/99.08

FOREIGN PATENT DOCUMENTS 7-254202    10/1995   (JP) .

* cited by examiner

Primary Examiner—Brian E. Miller
(74) Attorney, Agent, or Firm—Finnegan, Henderson, Farabow, Garrett & Dunner, L.L.P.

(57) ABSTRACT

In a rotor unit of a disk supporting and rotating means, a disk support portion and a rotor accommodating portion project from a pole-shaped portion that extends along the disk rotation axis. When an optical head is moved so that its lens portion is opposed to an innermost portion of a disk, it goes into a space that is formed between the disk support portion and the rotor magnet accommodating portion.

3 Claims, 7 Drawing Sheets

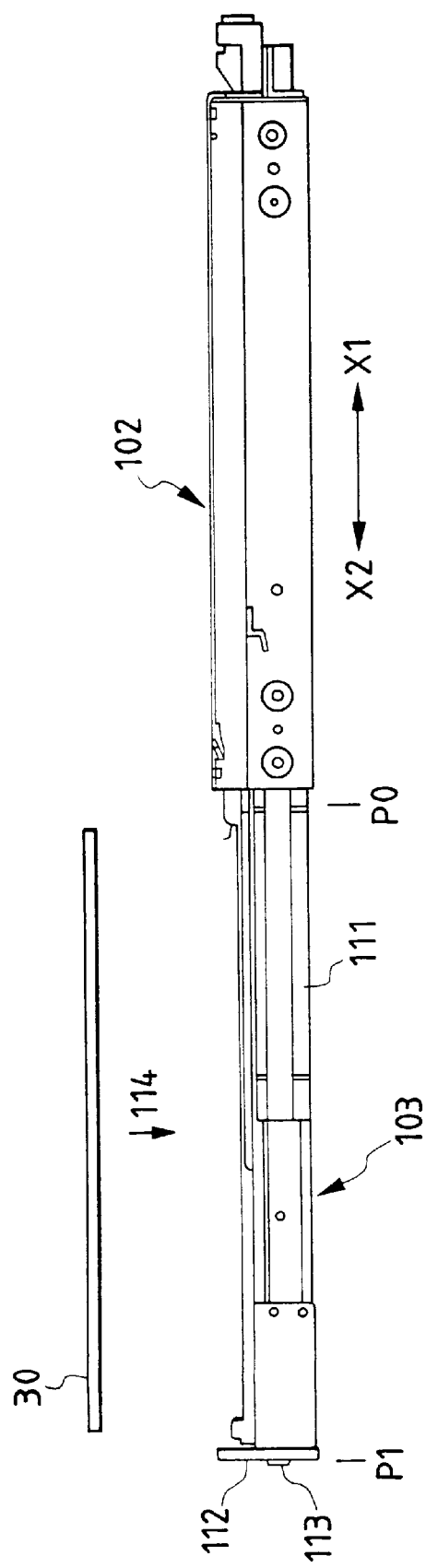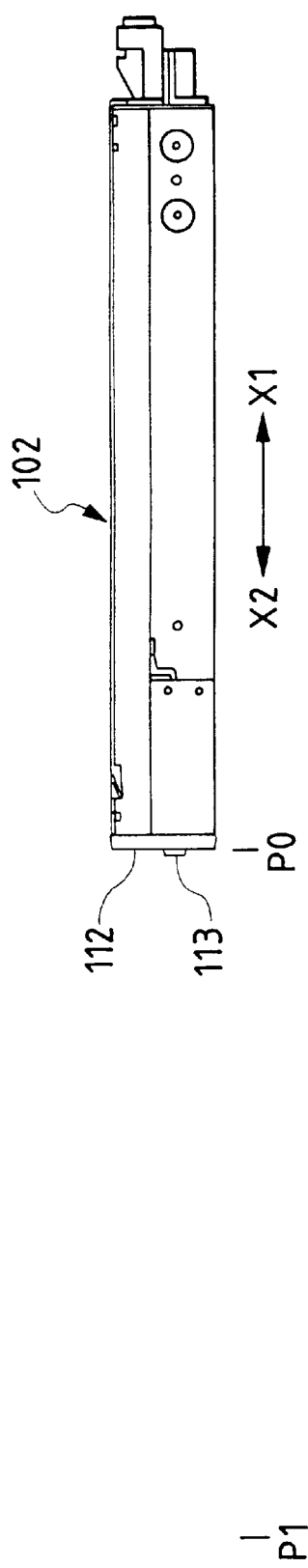

DISK APPARATUS WITH VERTICALLY ARRANGED OPTICAL HEAD AND ROTOR MAGNET ACCOMMODATING PORTION

BACKGROUND OF THE INVENTION

1. Field of the Invention

The present invention relates to disk apparatuses and, more specifically, to disk apparatuses which write information to a disk-shaped recording medium and/or read information therefrom by using an optical head while rotating the disk-shaped recording medium.

2. Description of the Related Art

A conventional disk apparatus, which is specifically a CD-ROM apparatus, will be hereinafter described. FIG. 6 is a plan view of a CD-ROM apparatus that was proposed by the present assignee in Japanese Unexamined Patent Publication No. Hei. 7-254202. FIG. 7 is a partial sectional view taken along line VI—VI in FIG. 6. FIG. 8 is a sectional view of a 120-mm-diameter CD-ROM disk (hereinafter referred to simply as "disk") that is used in the CD-ROM apparatus concerned.

A disk 30 is shaped such that a 15-mm-diameter opening 30a is formed at a central portion of a 120-mm-diameter circular plate. An area from the perimeter of the opening 30a to a 50-mm-diameter circle is a non-recording area 30b, and an area from the 50-mm-diameter circle to a 116-mm-diameter circle is a recording area 30c. In the non-recording area 30b, an area from the 15-mm-diameter circle to a 33-mm-diameter circle is a clamping area 30d that is used for a CD-ROM apparatus 1 to support the disk 30.

The CD-ROM apparatus 1 is generally composed of a chassis assembly 2 and a movable assembly 3 that is held by the chassis assembly 2 so as to be movable in directions X1 and X2. The movable assembly 3 is provided with a disk supporting and rotating means 4 for supporting and rotating the disk 30 which means is composed of a rotor unit 4a and a stator unit 4b. The movable assembly 3 further includes an optical head 5 for reading information from the disk 30, and an optical head moving means 6 for moving the optical head 5 in the radial direction of the disk 30.

The disk supporting and rotating means 4 has a configuration including a known radial-gap-type spindle motor. The rotor unit 4a has a rotary shaft 7, a case body 8, a turn table 9, and an annular rotor magnet 10. The stator unit 4b has a bearing unit 11, and a stator coil 14 that is constituted of a core 12 and a winding 13 that is wound on the core 12. In the spindle motor, when the stator coil 14 is energized while being controlled by a rotation control means (not shown), it exerts magnetic drive force on the rotor magnet 10, so that the rotor unit 4a is rotated.

The case body 8 and the turn table 9 are integral with each other and fixed to the rotary shaft 7. A disk support portion 9a of the turn table 9, which portion is about 15 mm in radius, supports the disk 30 while contacting with its clamping area 30d. A rotor magnet accommodating portion 8a of the case body 8, which portion is about 13 mm in radius, accommodates the annular rotor magnet 10.

The optical head 5 is required that a lens portion 5a be movable to a location that is opposed to the inner border of the recording area 30c of the disk 30 which border is 25-mm apart from the rotation center of the disk 30. On the other hand, to prevent an end 5b of the optical head 5 on the side of the disk supporting and rotating means 4 from contacting the rotor unit 4a of the means 4, the outer dimensions of the optical head 5 should be such that the distance from the lens portion 5a to the end 5b is shorter than about 12 mm, which is the distance 25 mm from the disk rotation center to the lens portion 5a minus the radius 13 mm of the rotor unit 4a.

In the disk apparatus 1, as shown in FIG. 7, the rotor magnet accommodating portion 8a of the disk supporting and rotating means 4 and the optical head 5 are located side by side in the disk radial direction. Therefore, the dimensions and the shape of each of the disk supporting and rotating means 4 and the optical head 5 are so restricted as to avoid interference therebetween.

That is, the radius p of the rotor magnet accommodating portion 8a of the rotor unit 8 and the distance q between the lens portion 5a and the end 5b of the optical head 5 should satisfy a relationship $p+q<25$ mm.

As for the disk supporting and rotating means 4, the diameter of the rotor unit 4a cannot be made large because of the limitation on the diameter of the rotor magnet 10. Therefore, the moment of the magnetic drive force of the disk supporting and rotating means 4 is relatively small, which is disadvantageous in increasing the rotation speed. In particular, in thinner CD-ROM apparatuses (for notebook-type computers) which should employ a 5-V drive voltage, the moment of the magnetic drive force is insufficient and it takes 2 to 5 seconds to complete a CLV track search. Thus, the desired data transfer rate of 6-fold/8-fold speed is not attained. Further, in quadruple-speed CD-ROM apparatuses, the necessary rotation speed is attained by employing a 12-V drive voltage because it cannot be attained by a 5-V drive voltage, which is employed in double-speed CD-ROM apparatuses. However, the increased drive voltage causes a problem of a large power consumption. The increased drive voltage also increases the amount of generated heat and, hence, requires a stronger cooling means than in the previous cases. This is disadvantageous in reducing the size and the cost of the apparatus.

As for the optical head 5, it is difficult to design the inside structure because the distance q between the lens portion 5a and the end 5b is so restricted that the optical head 5 does not interfere with the disk supporting and rotating means 4 when the lens portion 5a is moved to be opposed to the inner periphery of the disk 30. This problem is remarkable in optical heads capable of writing, such as an optical head of a CD-R apparatus.

SUMMARY OF THE INVENTION

The present invention has been made in view of the above problems in the art and, therefore, has an object of providing a disk apparatus which has a high degree of freedom in determining the dimensions and the shape of each of a disk supporting and rotating means and an optical head.

According to the invention, there is provided a disk apparatus comprising:

an optical head for writing and reading information to and from a disk-shaped recording medium while being opposed thereto;

optical head moving means for moving the optical head in a radial direction of the recording medium; and disk supporting and rotating means including:

a pole-shaped portion extending along a rotation axis of the recording medium;

a rotor unit which has a rotor magnet and rotates while supporting the recording medium; and a stator unit having a stator coil that is disposed in the vicinity of the rotor magnet, the rotor unit including first and second protrusions extending outward from the pole-shaped portion so as to form a recess in between, the first protrusion being a portion for supporting the recording medium while contacting with it, the second protrusion being a portion for accommodating the rotor magnet, and the recess being a space which the optical head goes into when it is moved to a position corresponding to an innermost portion of the recording medium.

With the above configuration, the restrictions on the dimensions and the shape of the optical pickup and/or the disk supporting and rotating means can be reduced.

BRIEF DESCRIPTION OF THE DRAWINGS

FIGS. 5A and 5B are side views of the CD-ROM apparatus in the states of FIGS. 3 and 4, respectively;

DESCRIPTION OF THE PREFERRED EMBODIMENT

First, a general configuration of a CD-ROM apparatus according to an embodiment of the present invention will be described.

Figure 1:
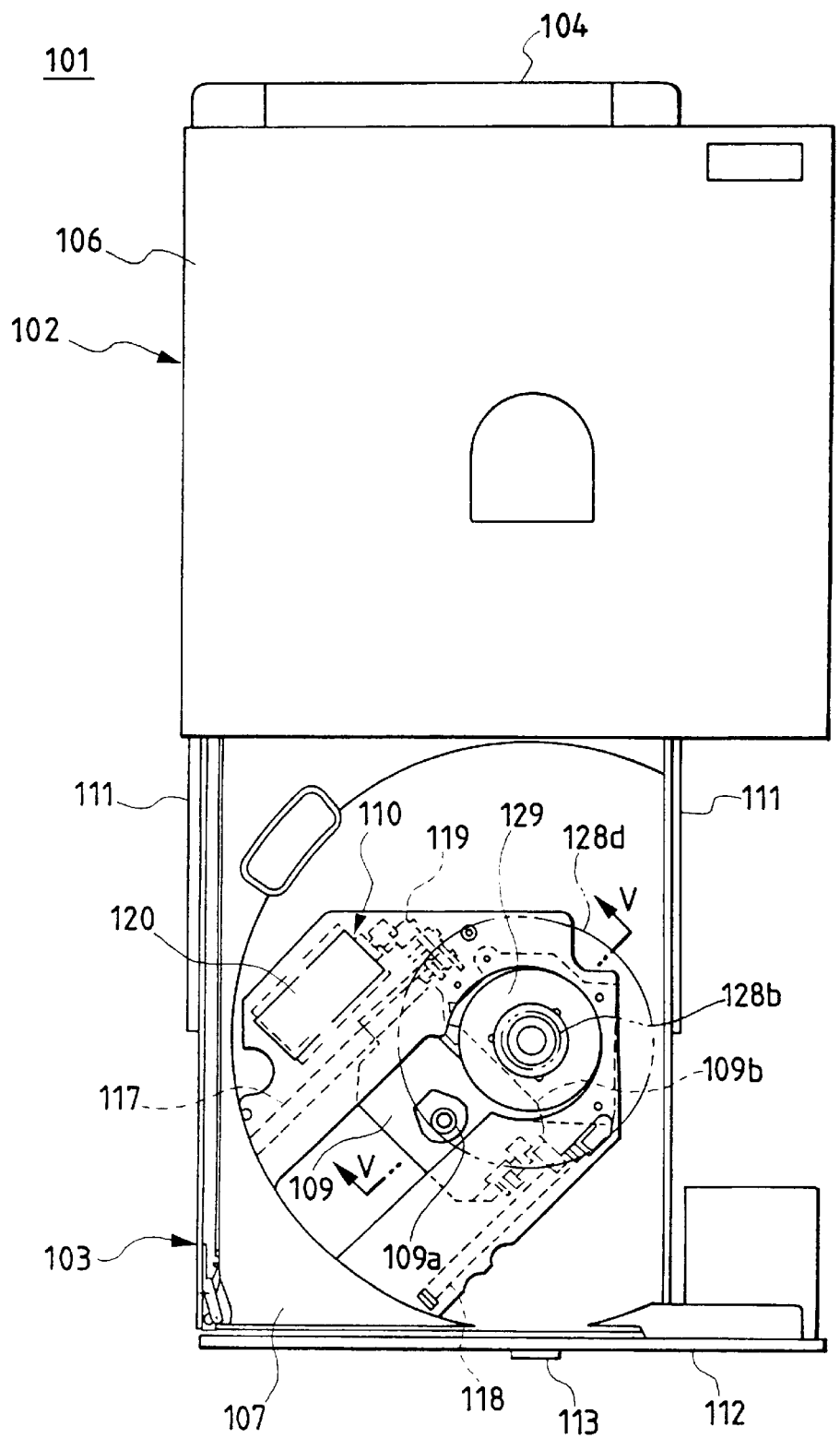
FIG. 1 is a plan view of a CD-ROM apparatus according to an embodiment of the present invention.
Figure 3:
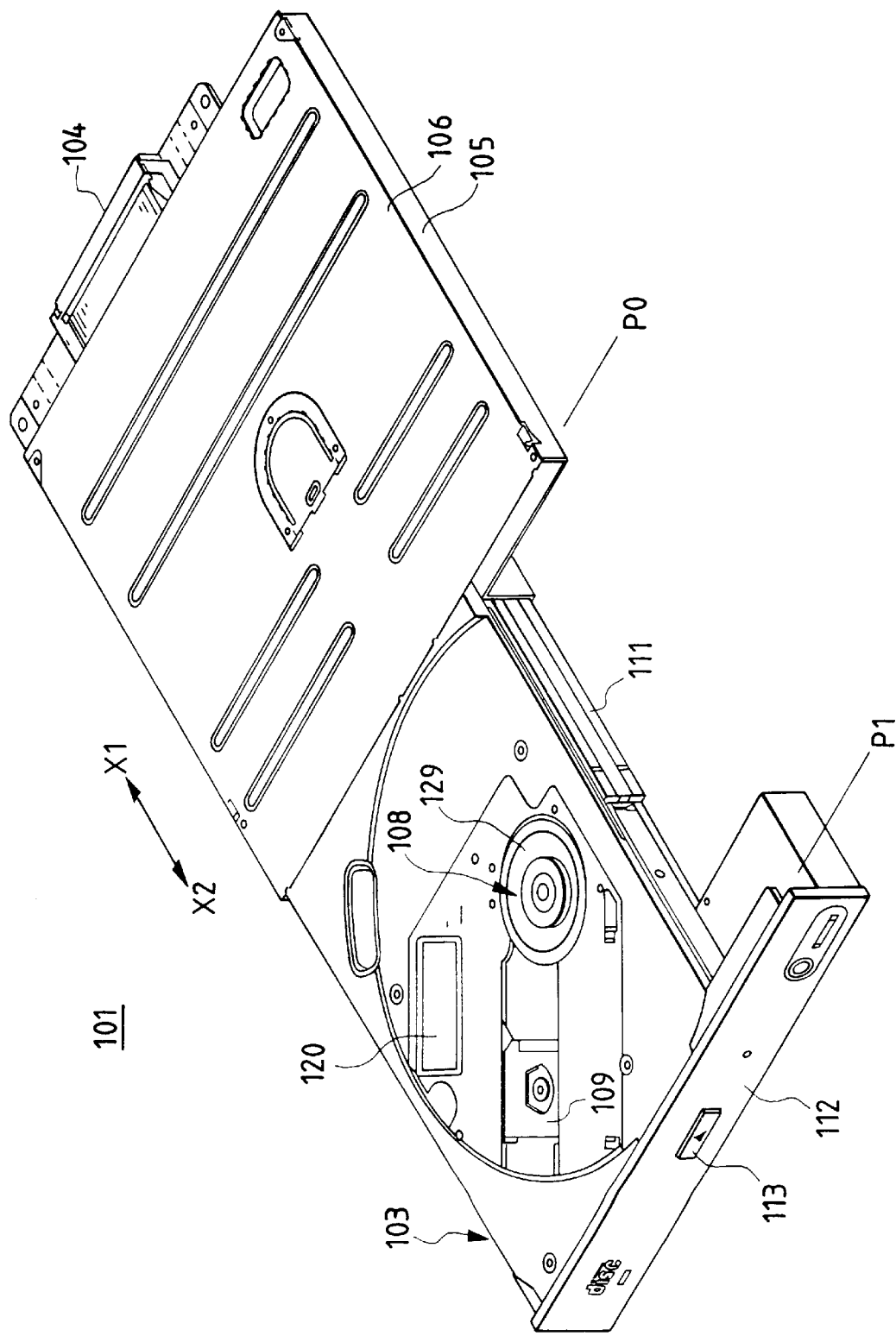
FIG. 3 is a perspective view showing the CD-ROM apparatus of FIG. 1 in a state that a movable assembly is pulled out.
Figure 4:
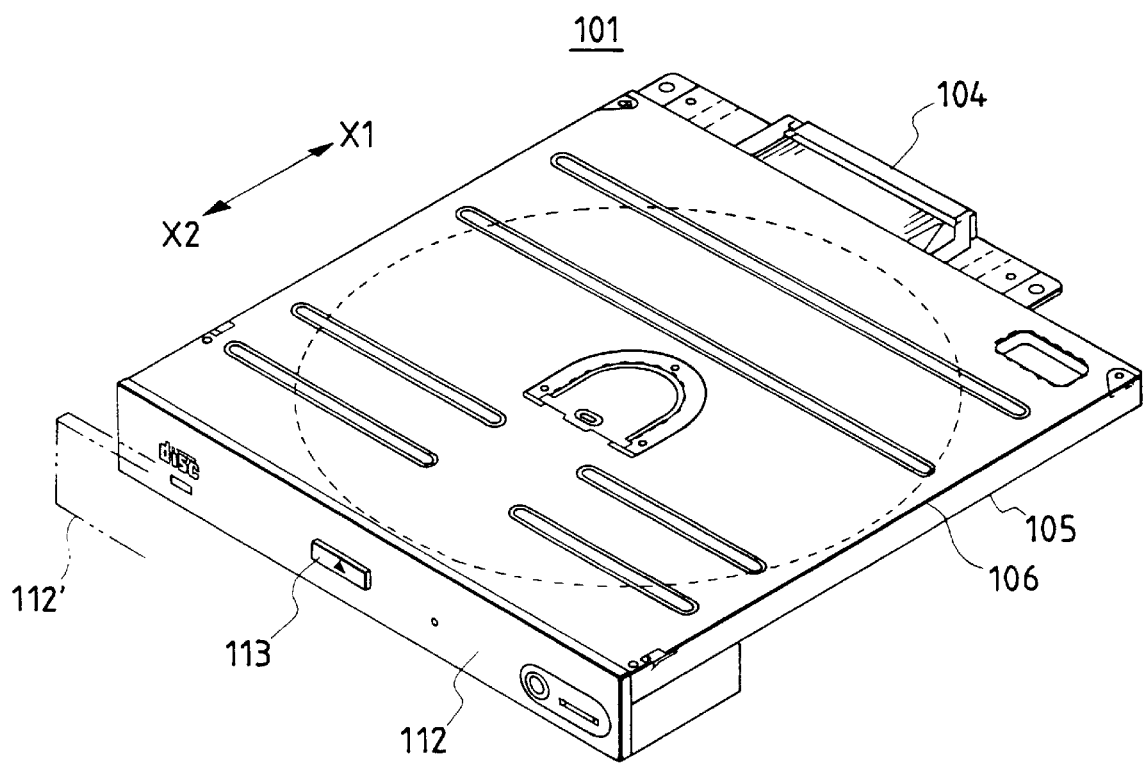
FIG. 4 is a perspective view showing the CD-ROM apparatus of FIG. 1 in a state that the movable assembly is accommodated in a chassis assembly.
Figure 6:
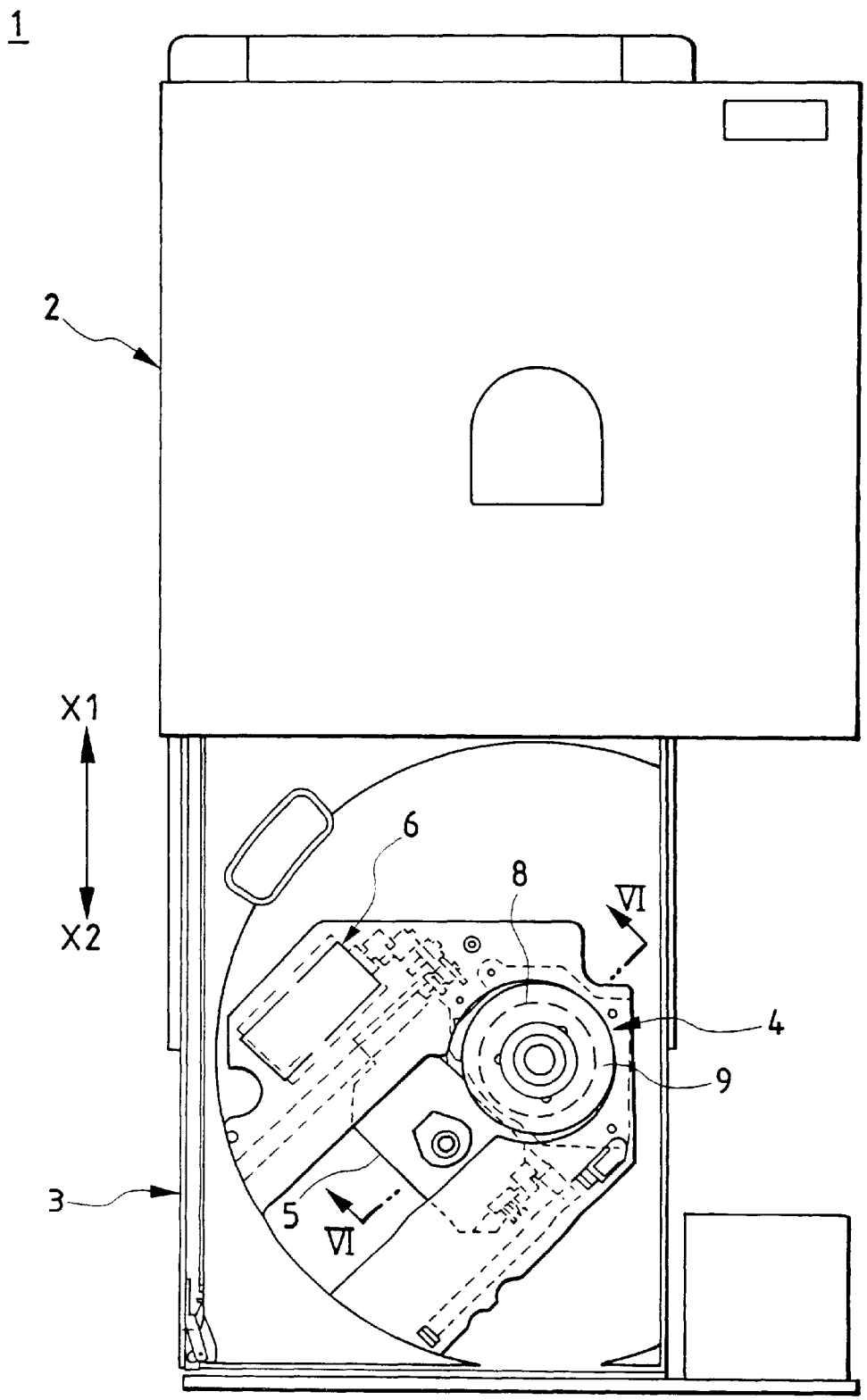
FIG. 6 is a plan view of a conventional, general CD-ROM apparatus.
Figure 7:
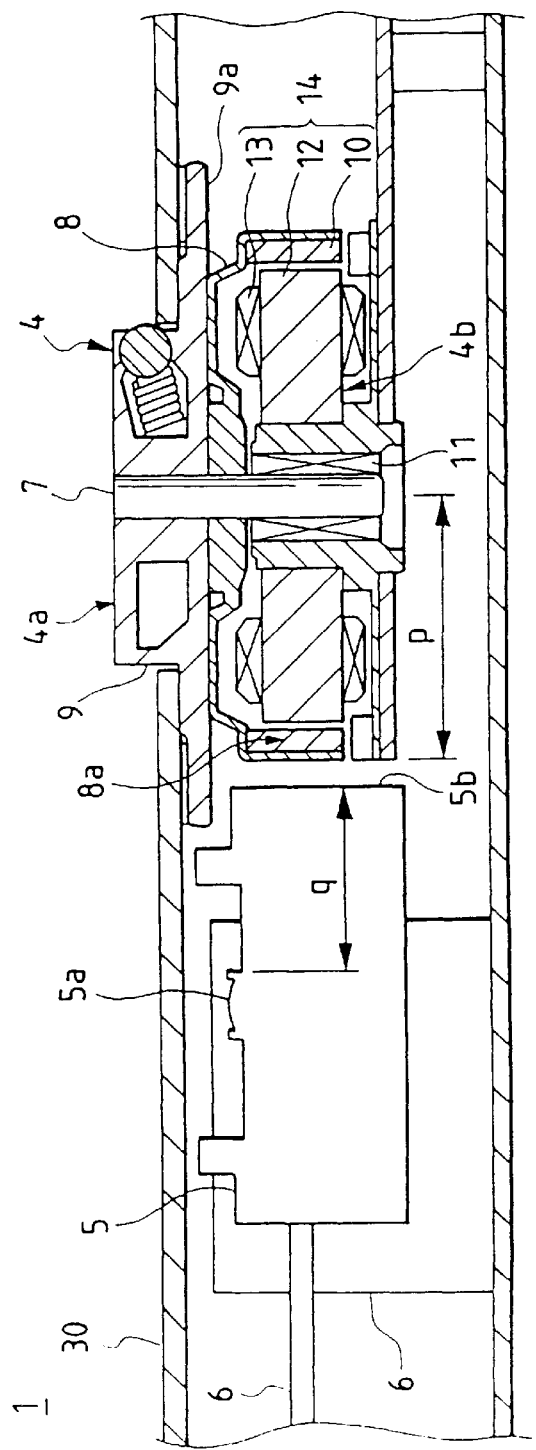
FIG. 7 is a partial sectional view taken along line VI—VI in FIG. 6.
Figure 8:
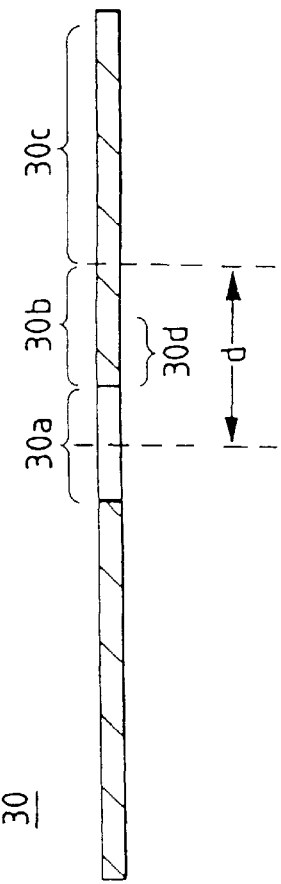
FIG. 8 is a sectional view of a CD-ROM disk.

FIGS. 1, 3 and 5A show a CD-ROM apparatus 101 in a state that a disk 30 is to be mounted thereon or removed therefrom. FIGS. 4 and 5B show the CD-ROM apparatus 101 in an ordinary state (stop mode or reproduction mode).

The CD-ROM apparatus 101 is generally composed of a chassis assembly 102 and a movable assembly 103 that is held by the chassis assembly 102 so as to be movable in directions X1 and X2. The CD-ROM apparatus 101 is incorporated in a computer (not shown) with the chassis assembly 102 attached to a computer main body (not shown). The CD-ROM apparatus 101 is electrically connected to the computer via a connector 104 that is provided at the end (in direction X1) of the CD-ROM apparatus 101.

The chassis assembly 102, which is generally box-shaped, is constituted of a chassis main body 105 made of a metal sheet and a metal cover member 106.

The movable assembly 103 consists of a movable main body 107, and a disk supporting and rotating means 108, an optical head 109, an optical head moving means 110, and other members that are mounted on the movable main body 107.

The movable assembly 103 is supported by guide rail mechanisms 111 provided on both sides in the width direction so as to be movable in directions X1 and X2 between an accommodation position P0 where the movable assembly 103 is accommodated in the chassis assembly 102 and a pull-out position P1 where the movable assembly 103 is pulled out of the chassis assembly 102.

Next, the operation of the CD-ROM apparatus 101 will be described.

In the ordinary state (stop mode), as shown in FIGS. 4 and 5B, the movable assembly 103 is located at the end position P0 (in direction X1) and locked by means of a lock mechanism (not shown).

To read information from a disk 30, an operator pushes an eject button 113 that is located at the center of a front bezel 112. In response, the movable assembly 103 is released from the lock mechanism, and is somewhat projected in direction X2 as indicated by two-dot chain lines 112' in FIG. 4. In this state, the operator holds the projected portion and pulls the movable assembly 103 in direction X2 to the end position P1.

Thus, the movable assembly 103 is pulled out to the pull-out position P1 shown in FIGS. 1, 3 and 5A while being supported by the guide rail mechanisms 111.

In this state, as shown in FIG. 5A, the operator pushes the disk 30 against the disk supporting and rotating means 108 in a direction indicated by arrow 114 to thereby cause the disk 30 to be held by a known ball clamp mechanism that is integral with the disk supporting and rotating means 108.

Subsequently, the operator pushes the front bezel 112 to move the movable assembly 103 in direction X1 to the end position P0. When the movable assembly 103 reaches the accommodation position P0, it is locked by the lock mechanism. The CD-ROM apparatus 101 assumes the state shown in FIGS. 4 and 5B, in which state the disk 30 is accommodated in the chassis assembly 102.

Thereafter, the disk supporting and rotating means 108 starts to rotate the disk 30 and the optical head also starts to operate. As a result, information is read from the disk 30, and supplied to the computer via the connector 104.

The disk 30 is ejected in the same manner as described above. That is, the operator pushes the eject button 113 to cause the movable assembly 103 to somewhat project, and then pulls it out in direction X2.

Figure 2:
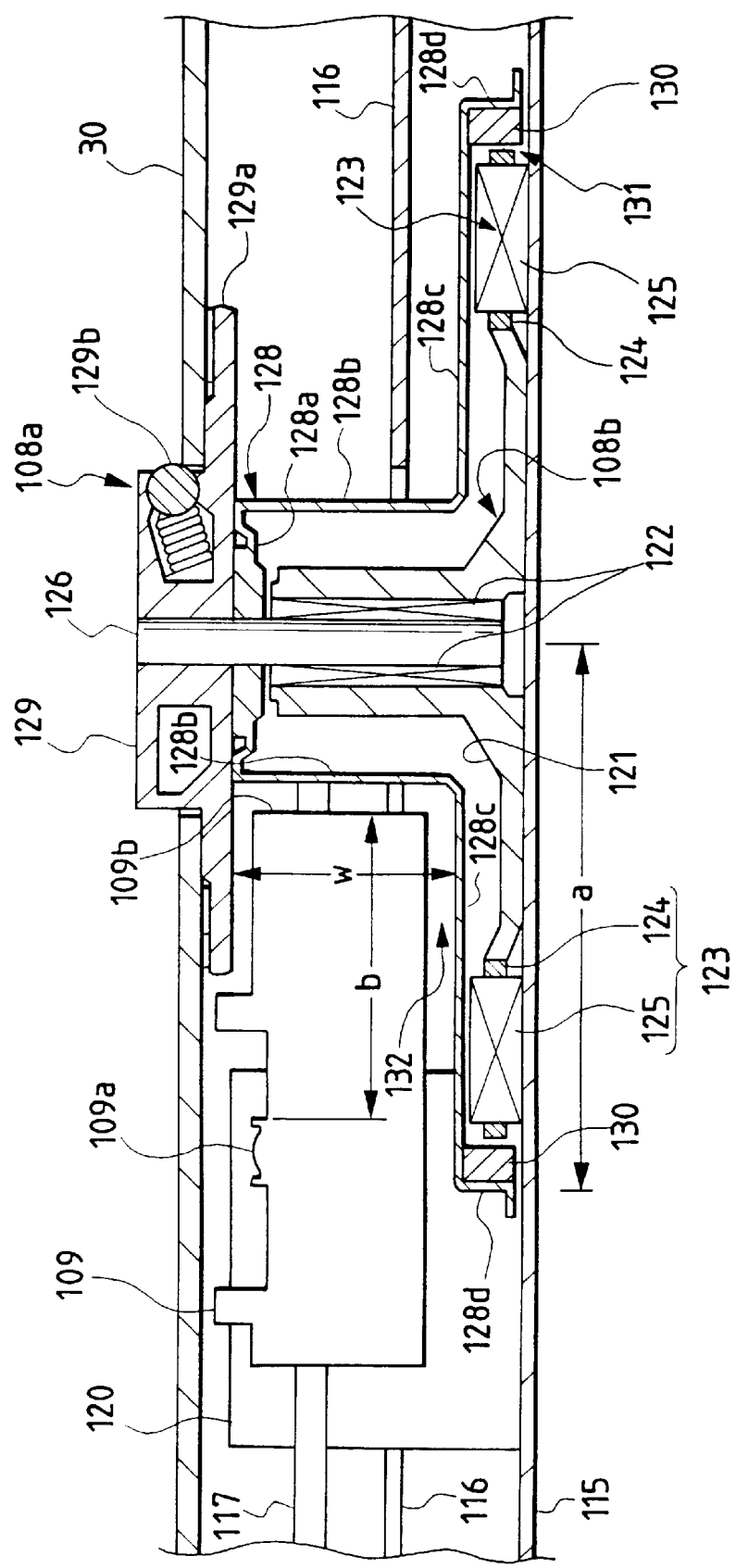
FIG. 2 is a partial sectional view taken along line V—V in FIG. 1.

Next, the main part of the invention will be described. FIG. 2, which is a partial sectional view taken along line V—V in FIG. 1, shows a relationship in arrangement among the disk supporting and rotating means 108, the optical head 109, and the disk 30 that is supported by the disk supporting and rotating means 108.

A printed circuit board 115 is supported by the movable main body 107, and the disk supporting and rotating means 108 and electronic parts (not shown) are mounted on the printed circuit board 115.

A printed circuit board 116 is supported by the movable main body 107. A screw shaft 117, a guide shaft 118, a gear train 119, and a thread motor 120 all of which constitute the optical head moving means 110, and other electronic parts (not shown) are mounted on the printed circuit board 116.

The disk supporting and rotating means 108 includes a DC direct drive, brushless radial gap-type spindle motor, and is constituted of a rotor unit 108a that rotates while supporting the disk 30, and a stator unit 108b that rotatably supports the rotor unit 108a.

The stator unit 108b is constituted of a housing 121 and a stator coil 123. The housing 121, which is fixed to the printed circuit board 115, has a bearing unit 122. The stator coil 123 is composed of a core 124 and a winding 125 that is regularly wound thereon. The winding 125 assumes an annular shape, and is fixed to the printed circuit board 115.

The rotor unit 108a of the disk supporting and rotating means 108 is constituted of a rotary shaft 126, a case body 128, a turn table 129, and a rotor magnet 130. The rotary shaft 126 generally assumes a cylindrical shape. One end portion of the rotary shaft 126 is rotatably supported by the bearing unit 122, and the other end portion is fixed to the case body 128 and the turn table 129.

The case body 128 is constituted of a horizontal portion 128a that is fixed to the rotary shaft 126 so as to extend generally parallel with the disk placement surface, a vertical portion 128b that extends from the outer periphery of the horizontal portion 128a generally perpendicularly to the disk placement surface, a horizontal portion 128c that expends from the bottom end of the vertical portion 128b generally parallel with the disk placement surface, and a vertical portion 128d that extends from the outer periphery of the horizontal portion 128c generally perpendicularly to the disk placement surface. Thus, the case body 128 assumes a step-like shape.

The horizontal portion 128c and the vertical portion 128d constitutes a rotor magnet accommodating portion 131 (second protrusion). The rotor magnet 130 is fixed to the inside surface of the vertical portion 128d.

The turn table 129 is supported by the rotary shaft 126, and fixed to the horizontal portion 128a of the case body 128. The configuration in which the turn table 129 is fixed to both the rotary shaft 126 and the case body 128 is advantageous over the configuration in which the turn table 129 is fixed to only the rotary shaft 126 in that the rotary shaft 126 is stabilized and the disk eccentricity is thereby reduced.

The turn table 129 is composed of a disk support portion 129a (first protrusion) that projects outward, and a fitting portion 129b that fits into the opening 30a of the disk 30. The disk support portion 129a supports the disk 30 while contacting with the clamping area 30d of the disk 30. The fitting portion 129b is provided with a known ball clamp mechanism, which, together with the disk support portion 129a, holds the disk 30.

The bottom surface of the disk support portion 129a and the top surface of the horizontal portion 128c that constitutes the rotor magnet accommodating portion 131 are separated from each other by a distance W, thereby providing a space 132 (recess).

The optical head 109 has a lens portion 109a that serves as a laser beam input/output window, that is, applies a laser beam to the recording surface of the disk 30 and receives light reflected therefrom for reading of information.

The optical head moving means 110 is constituted of the screw shaft 117 and the guide shaft 118 that support the respective ends of the optical head 109, the thread motor 120, and the gear train 119 that transmits drive force of the thread motor 120 to the screw shaft 117. Constituted as such, the optical head moving means 110 moves the optical head 109 in the disk radial direction.

As shown in FIG. 2, when the optical head 109 is moved so that the lens portion 109a is opposed to an disk innermost portion, the optical head 109 goes into the space 132.

The above configuration increases the degree of freedom in determining the dimensions and the shape of each of the optical pickup and the rotor magnet.

Specific dimensions of the disk supporting and rotating means 108 and the optical head 109 according to this embodiment will be described below.

The radius of the fitting portion 129b is 7 mm, which is slightly smaller than the radius 7.5 mm of the opening 30a of the disk 30 so that the fitting portion 129b properly fits into the opening 30a.

The radius of the disk support portion 129b (first protrusion) is 16 mm, which is approximately equal to the radius of the clamping area 30d of the disk 30.

The radius a of the rotor magnet accommodating portion 131 (second protrusion; vertical portion 128d) is 27 mm. The radius of the rotor magnet 130, which is accommodated in and fixed to the accommodating portion 131, is 26 mm (at the maximum radius portion).

As for the space 132 (recess), the radius of the vertical portion 128b of the disk supporting and rotating means 108 is 6 mm.

As for the optical head 109, a distance b from the lens portion 109a to an end 109b on the side of the rotation center of the disk supporting and rotating means 108 is 16 mm.

As described above, according to the invention, because the rotor magnet accommodating portion 131 and the optical head 109 are arranged in the vertical direction, the optical head 109 is allowed to go into the recess that is formed between the rotor magnet accommodating portion 131 and the disk support portion 129a. Therefore, the degree of freedom in determining the dimensions and the shape of each of the rotor magnet accommodating portion 131 and the optical head 109 can be increased. That is, the radius a of the rotor magnet accommodating portion 131 of the disk supporting and rotating means 108 and the distance b between the lens portion 109a and the end 109b of the optical head 109 are allowed to have a relationship $$a+b>25 \text{ mm}.$$

By virtue of an increased degree of freedom in determining the dimensions and the shape of the optical head, the optical head can be designed more easily.

Since the diameters of the rotor magnet and the stator coil of the disk supporting and rotating means can be increased, the moment of the magnetic drive force can be increased accordingly, whereby high-speed rotation can be attained at even a low voltage. This contributes to reduction of the power consumption of the disk apparatus. Further, since the low-voltage driving results in a small amount of heat generated by the disk supporting and rotating means, heat-dissipation-related design can be simplified. Thus, the size and the cost of the apparatus can be reduced.

It is noted that the invention is not limited to the ball-clamp-type disk apparatus, but may be applied to disk apparatuses that employ ordinary clamping.

Further, the invention can also be applied to apparatuses that use a compact disc, a magneto-optical disk, etc.

What is claimed is:

1. An optical disk apparatus comprising:

an optical head for writing and reading information to and from an optical disk while being opposed thereto;

optical head moving means for moving the optical head in a radial direction of the optical disk;

disk supporting and rotating means including:
a pole-shaped portion extending along a rotation axis of the optical disk;
a rotor unit which has a rotor magnet and rotates while supporting the optical disk; and
a stator unit having a stator coil that is disposed in the vicinity of the rotor magnet,
the rotor unit including first and second protrusions extending outward from the pole-shaped portion so as to form a recess in between, the first protrusion being a portion for supporting the optical disk while contacting with it, the second protrusion being a portion for accommodating the rotor magnet, and the recess being a space which the optical head goes into when it is moved to a position corresponding to an innermost portion of the optical disk, wherein a sum of a radius of the rotor magnet accommodating portion and a distance between a lens portion and an inner end of the optical head is larger than a radius of an outer border of a non-recording area of the optical disk.

2. The optical disk apparatus according to claim 1, wherein the disk supporting and rotating means includes a DC direct drive, brushless radial gap-type spindle motor.

3. The optical disk apparatus according to claim 1, wherein the radius of the outer border of the non-recording area of the optical disk is 25 mm.

\* \* \* \* \*